(12) United States Patent
Gonzalez-Banos et al.

(10) Patent No.: US 8,060,251 B2
(45) Date of Patent: Nov. 15, 2011

(54) INTERFACE FOR ROBOT MOTION CONTROL

(75) Inventors: Hector H. Gonzalez-Banos, Mountain View, CA (US); Victor Ng-Thow-Hing, Sunnyvale, CA (US); Allen Y. Yang, Urbana, IL (US)

(73) Assignee: Honda Motor Co., Ltd., Tokyo (JP)

( * ) Notice: Subject to any disclaimer, the term of this patent is extended or adjusted under 35 U.S.C. 154(b) by 958 days.

(21) Appl. No.: 11/296,174

(22) Filed: Dec. 6, 2005

(65) Prior Publication Data

US 2006/0161300 A1    Jul. 20, 2006

Related U.S. Application Data

(60) Provisional application No. 60/633,998, filed on Dec. 6, 2004.

(51) Int. Cl.
*G05B 19/04* (2006.01)

(52) U.S. Cl. ... 700/246; 700/245; 700/247; 318/568.11; 318/568.12; 901/1; 901/2

(58) Field of Classification Search ................ 700/245, 700/264, 83, 86, 14, 18, 183, 247, 250, 253, 700/260, 262, 257, 246; 318/568.1, 568.11, 318/565, 568.2, 568.24, 567, 625, 626; 901/2, 901/3, 8, 14, 19, 1
See application file for complete search history.

(56) References Cited

U.S. PATENT DOCUMENTS

| | | | |
|---|---|---|---|
| 4,908,556 A | 3/1990 | Daggett et al. | |
| 5,303,384 A | 4/1994 | Rodriguez et al. | |
| 5,519,814 A | 5/1996 | Rodriguez et al. | |
| 5,560,022 A | 9/1996 | Dunstan et al. | |
| 5,963,447 A | 10/1999 | Kohn et al. | |
| 6,144,884 A | 11/2000 | Niemeyer et al. | |
| 6,442,451 B1 | 8/2002 | Lapham | |
| 6,526,332 B2 | 2/2003 | Sakamoto et al. | |
| 6,675,070 B2 | 1/2004 | Lapham | |
| 6,760,648 B2 | 7/2004 | Sakamoto et al. | |
| 6,889,118 B2 | 5/2005 | Murray, IV et al. | |
| 7,302,312 B2 | 11/2007 | Murray, IV et al. | |
| 2002/0131454 A1* | 9/2002 | Franke et al. ............... 370/503 |

(Continued)

OTHER PUBLICATIONS

Schulzrinne, Henning, RTP and playout delay compensation, Fall 2003, Columbia University, Dept. of Computer Science.*

(Continued)

*Primary Examiner* — Khoi Tran
*Assistant Examiner* — Spencer Patton
(74) *Attorney, Agent, or Firm* — Fenwick & West LLP; Mark E. Duell

(57) ABSTRACT

Systems and methods are presented that enable a higher-level software application to control a robot's motion through a generic motion interface. In one embodiment, a system includes a controller, an interface, and a set of robot driver modules. The interface receives a command from the controller and translates the command into another command to send to the driver modules. The interface includes a client, a server, and a network. The server includes two interfaces: a client interface to communicate with the client and a driver interface to communicate with the driver modules. The server also includes two buffers: a command queue and a reply queue. The command queue stores commands received from the controller (via the client). The reply queue stores replies received from the driver modules.

20 Claims, 7 Drawing Sheets

U.S. PATENT DOCUMENTS

| | | | |
|---|---|---|---|
| 2003/0187426 A1* | 10/2003 | Wang et al. | 606/1 |
| 2003/0220715 A1* | 11/2003 | Kneifel et al. | 700/248 |
| 2004/0133308 A1 | 7/2004 | Kato et al. | |
| 2004/0176875 A1 | 9/2004 | Iribe et al. | |
| 2005/0021186 A1* | 1/2005 | Murray et al. | 700/245 |
| 2006/0217837 A1 | 9/2006 | Koga et al. | |
| 2008/0071423 A1 | 3/2008 | Murray, IV et al. | |

OTHER PUBLICATIONS

Major et al, Robotic Applicatin of the Vision System for Object Distancing and Ranging, Aug. 2000, Royal Military College of Canada, Dept. of Electrical and Computer Engineering, IEEE.*

PCT International Search Report and Written Opinion, PCT/US05/44069, Dec. 4, 2006.

ActivMedia Robotics, LLC, "ARIA—ActivMedia Robotics' Interface for Applications" [online] 2004 [Retrieved on Nov. 4, 2005] Retrieved from the Internet: <URL: http://robots.activmedia.com/ARIA/>.

Gerkey, B. et al., "Most Valuable Player: A Robot Device Server for Distributed Control", Proceedings: IEEE/RSJ International Conference on Intelligent Robots and Systems (IROS), Oct. 29-Nov. 3, 2001, pp. 1226-1231, Wailea, Hawaii, USA.

Gerkey, B. et al., "The Player/Stage Project: Tools for Multi-Robot and Distributed Sensor Systems", Proceedings: IEEE International Conference on Advanced Robotics (ICAR), Jun. 30-Jul. 3, 2003, pp. 317-323, Coimbra, Portugal.

Hirose, M. et al., "Development of the Humanoid Robot ASIMO", Honda R&D Technical Review, Apr. 2001, vol. 13, No. 1.

Humanoid Animation Working Group, "H-anim 1.1 Specification for a Standard Humanoid" [online] 1999 [Retrieved on Nov. 4, 2005] Retrieved from the Internet: <URL: http://www.h-anim.org/Specifications/H-anim1.1/>.

Kanehiro, F. et al., "OpenHRP: Open Architecture Humanoid Robotics Platform", The International Journal of Robotics Research, Feb. 2004, vol. 23, No. 2, pp. 155-165, Sage Publications.

Kitano Symbiotic Systems Project, "Open PINO Platform" [online] 2002 [Retrieved on Nov. 4, 2005] Retrieved from the Internet: <URL: http://www.symbio.jst.go.jp/PINO/index.html>.

Lloyd, J. et al., "Multi-RCCL User's Guide", McGill University: Research Centre for Intelligent Machines [online] Jul. 1992 [Retrieved on Nov. 4, 2005] Retrieved from the Internet: <URL: http://citeseer.ist.psu.edu/cache/papers/cs/1047/ftp:zSzzSzftp.mcrcim.mcgill.eduzSzpubzSzrcclzSzrcclguide.pdf/lloyd92multirccl.pdf>.

Sony Corp., "Qrio: Sony Dream Robot" [online] 2005 [Retrieved on Nov. 4, 2005] Retrieved from the Internet: <URL: http://www.sony.net/SonyInfo/QRIO/top_nf.html>.

Gerkey, B. et al., "Player/Stage Project. Player" [online] Sep. 1, 2005 [Retrieved on Nov. 4, 2005] Retrieved from the Internet: <URL: http://playerstage.sourceforge.net/index.php?src=player>.

Walters, D., "The Open Automation Project (OAP)" [online] Feb. 9, 2005 [Retrieved on Nov. 4, 2005] Retrieved online: <URL: http://oap.sourceforge.net/>.

Bruyninckx, H., "The Orocos Project" [online] Aug. 4, 2005 [Retrieved on Nov. 4, 2005] Retrieved from the Internet: <URL: http://www.orocos.org/index.php>.

Vaughan, R. et al., "On Device Abstractions for Portable, Reusable Robot Code", Proceedings: IEEE/RSJ International Conference on Intelligent Robots and Systems (IROS), Oct. 2003, pp. 2121-2127, Las Vegas, Nevada, USA.

Biggs, G., et al., "A Survey of Robot Programming Systems", Proceedings: Australasian Conference on Robotics & Automation, Dec. 1-3, 2003, Brisbane, Australia, Paper 27, 10 Pages.

Kauppi, I., "Intermediate Language for Mobile Robots: A Link between the High-Level Planner and Low-Level Services in Robots", Sci.D. Dissertation: Department of Automation and Systems Engineering, Helsinki University of Technology, Dec. 12, 2003, 146 Pages.

Kitagishi, I., et al., "Development of motion data description language for robots based on eXtensible Markup Language—realization of better understanding and communication via networks", Proceedings: IEEE/RSJ Int'l Conference on Intelligent Robots and Systems, Sep. 30-Oct. 5, 2002, Lausanne, Switzerland, vol. 2, pp. 1145-1151.

Xiaohui, X., et al., "The design and implementation of real-time Internet-based telerobotics", Proceedings: IEEE Int'l Conference on Robotics, Intelligent Systems and Signal Processing, Oct. 8-13, 2003, Changsha, China, vol. 2, pp. 815-819.

Evolution Robotics, Inc., "ERSP 3.1: Robotic Development Platform," 2005, [Online] [Retrieved Feb. 24, 2010] Retrieved from the Internet <URL: http://www.evolution.com/products/ersp/datasheet.pdf>, 4 pages.

Karlsson, N. et al., "Core Technologies for Service Robotics," Proceedings of IEEE/RSJ International Conference on Intelligent Robots and Systems (IROS), Sep. 28-Oct. 2, 2004, Sendai, Japan, 6 pages.

Munich, M. et al., "ERSP: A Software Platform and Architecture for the Service Robotics Industry," Proceedings of IEEE/RSJ International Conference on Intelligent Robots and Systems (IROS), Aug. 2-6, 2005, Edmonton, Canada, 8 pages.

* cited by examiner

INTERFACE FOR ROBOT MOTION CONTROL

CROSS-REFERENCE TO RELATED APPLICATION

This application claims priority from the following U.S. provisional patent application, which is hereby incorporated by reference: Ser. No. 60/633,998, filed on Dec. 6, 2004, entitled "Controlling Arms, Bases, and Androids Through a Single Motion Interface."

BACKGROUND OF THE INVENTION

1. Field of the Invention

The present invention relates to enabling a higher-level software application to control a robot's motion through a generic motion interface.

2. Description of Background Art

Robot motion interfaces do exist, but they are either hardware-specific or support only very simple (non-humanoid) robots. As a result, the motion of a humanoid robot is generally controlled directly via its device drivers. Developers write their own driver interfaces to the specific robot. These driver interfaces are then used by applications in order to control the robot's motion. It is difficult to create these interfaces due to the lack of knowledge about the internal workings of the robot's proprietary software and hardware. The interfaces themselves tend to be very complex in order to provide access to the robot's various capabilities. Also, if the robot's hardware changes, the driver interfaces (and the applications using them) also need to change. This is inefficient because the same algorithms have to be reimplemented every time the hardware changes.

What is needed is a generic interface that enables a higher-level software application to control a robot's motion.

SUMMARY OF THE INVENTION

Systems and methods are presented that enable a higher-level software application to control a robot's motion through a generic motion interface. In one embodiment, a system includes a controller, an interface, and a set of robot driver modules. The controller is used to control the robot's motion via the interface. The interface uses the robot driver modules to directly control the robot. The robot can be either a physical entity or a virtual entity.

In one embodiment, the interface communicates with the controller using a first application programming interface (API) and with the driver modules using a second API. The interface receives a command from the controller and translates the command into another command to send to the driver modules. Commands include query commands, motion commands, and system commands.

In one embodiment, the interface includes a client, a server, and a network. The server includes two interfaces: a client interface to communicate with the client and a driver interface to communicate with the driver modules. The server also includes two buffers: a command queue and a reply queue. The command queue stores commands received from the controller (via the client). The reply queue stores replies received from the driver modules.

In one embodiment, the interface can operate in any one of four command modes: direct, delay, playback, and broadcast. In direct mode, the client sends commands to the server in blocking mode. In delay mode, playback mode, and broadcast mode, the client sends commands to the server in non-blocking mode. In delay mode and playback mode, the server uses buffering to compensate for possible network congestion. In delay mode, the client controls the size of the time delay. In playback mode, the server controls the size of the time delay. In broadcast mode, one query received from a client can cause a server to query a robot's state periodically.

In one embodiment, a system includes multiple controllers. In this embodiment, the interface includes multiple clients. In another embodiment, a system includes multiple sets of driver modules. In this embodiment, the interface includes multiple servers.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION OF THE EMBODIMENTS

Figure 1:
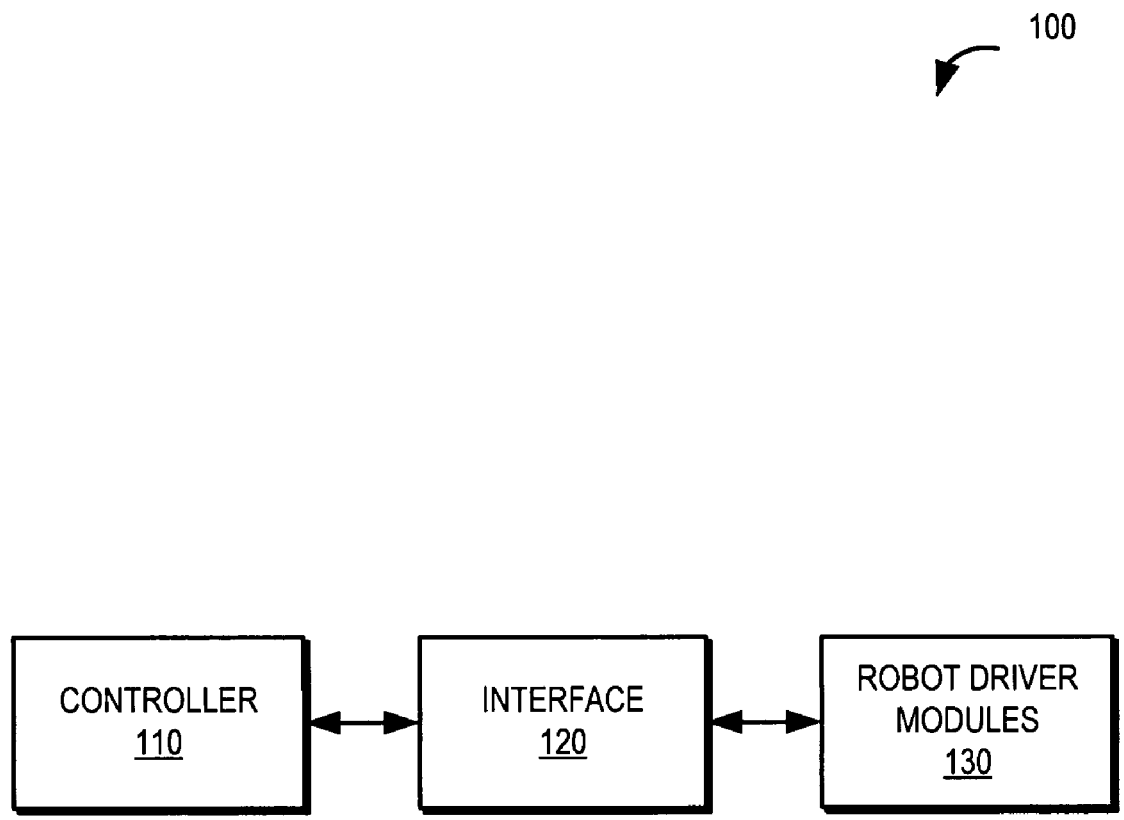
FIG. 1 illustrates a block diagram of a system for enabling a higher-level software application to control a robot's motion through a generic motion interface, according to one embodiment of the invention.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to an apparatus for performing the operations herein. This apparatus is specially constructed for the required purposes, or it comprises a general-purpose computer selectively activated or reconfigured by a computer program stored in the computer. Such a computer program is stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems are used with programs in accordance with the teachings herein, or more specialized apparatus are constructed to perform the required method steps. The required structure for a variety of these systems will appear from the description below. In addition, the present invention is not described with reference to any particular programming language. It will be appreciated that a variety of programming languages may be used to implement the teachings of the invention as described herein.

1. System for Robot Motion Control

FIG. 1 illustrates a block diagram of a system for enabling a higher-level software application to control a robot's motion through a generic motion interface, according to one embodiment of the invention. The system 100 includes a controller 110, an interface 120, and a set of robot driver modules 130. The interface 120 is communicatively coupled to both the controller 110 and the set of robot driver modules 130. The controller 110, the interface 120, and the set of robot driver modules 130 represent groups of functionality and can be implemented in only hardware, only software, or a mixture of both. In addition, while they are illustrated as separate modules in FIG. 1, the functionality of multiple modules can be provided by a single software application or hardware device. Alternatively, the functionality of one module can be provided by multiple software applications or hardware devices.

In one embodiment, the controller 110 comprises a software application used to control a robot's motion. The controller 110 communicates with the robot (not shown) via the interface 120. Signals sent from the controller 110 to the interface 120 include, for example, commands to be executed by the robot. Signals sent from the interface 120 to the controller 110 include, for example, the robot's replies to commands that it has received. In one embodiment, signals sent between the controller 110 and the interface 120 comply with an application programming interface (API) that is provided by the interface 120.

In one embodiment, the set of robot driver modules 130 comprises a set of software drivers and/or libraries that can be used to directly control a robot (not shown). Signals sent from the interface 120 to the set of robot driver modules 130 include, for example, commands to be executed by the robot. The commands sent are determined based on the commands received from the controller 110. Signals sent from the set of robot driver modules 130 to the interface 120 include, for example, the robot's replies to commands that it has received. In one embodiment, signals sent between the interface 120 and the set of robot driver modules 130 comply with a second API that is provided by the set of robot driver modules 130.

The robot that is controlled by the set of robot driver modules 130 can be either a physical entity or a virtual (i.e., simulated) entity. Physical robots can include a wide-range of robot mechanisms, from mobile bases such as a Pioneer 2 from ActivMedia Robotics, LLC of Amherst, N.H., to humanoid robots such as ASIMO from Honda Motor Co., Ltd. of Japan, QRIO from Sony Corp. of Japan, and PINO from the Kitano Symbiotic Systems Project of the Japan Science and Technology Agency. Virtual entities can include software models that represent robots or other mobile objects or creatures. Such virtual entities are sometimes referred to as kinematic or kinodynamic simulators.

The first API (between the controller 110 and the interface 120) provides a unified interface for a controller 110 to control a robot. In one embodiment, the API is independent of both the hardware and software of the controller 110 and interface 120. Since the API commands are "translated" by the interface 120 into robot driver module 130 commands, the API is compatible across various robots at both a software and hardware level. This means that one controller 110 can be used to control multiple robots, each of which has different capabilities. The differences between the robots affect the interface 120 but not the controller 110. Specifically, the interface 120 will translate controller 110 commands differently based on the robot driver module 130 API available for each robot. Thus, a change in the robot's software or hardware will affect the interface 120 but not the controller 110.

In one embodiment, the first API comprises three types of commands and two types of replies. The commands, which are sent from the controller 110 to the interface 120, include query commands, motion commands, and system commands. The replies, which are sent from the interface 120 to the controller 110, include status signals and error signals.

A query command is used to determine a robot's state, such as its kinematic configuration. A motion command is used to make a robot move, such as by activating one or more motors. A system command is used to query and control system status.

A reply indicates the status of a command that has been received and can be either a status signal or an error signal. In one embodiment, there are four possible status signals: BUSY, SUCCESS, MODIFIED, and NA. The signal BUSY indicates that the robot cannot start executing the command because it has not finished executing a previous (non-interruptible) command.

The signal SUCCESS indicates that the interface 120 has acknowledged the command. Depending on the implementation of the interface 120 and/or the set of robot driver modules 130, this acknowledgement can indicate, for example, that the interface 120 has received the command, that the interface 120 has successfully begun executing the command, or that the interface 120 has finished executing the command. The signal MODIFIED indicates that the robot supports the command in a limited way (e.g., a holonomic command sent to a non-holonomic robot). The signal NA indicates that the robot does not support the command (e.g., a locomotion command sent to a fixed-base robot, such as a robotic arm mounted on a table).

In one embodiment, there are three possible error signals: ERROR, INTERRUPTED, and PANIC. The signal ERROR indicates that the interface 120 cannot execute the command because, for example, the robot is in an error state (e.g., because its parts have overheated) or an incompatible state (e.g., because performing the command from the robot's current state would cause the robot to collide with something). The signal INTERRUPTED indicates that execution of a legitimate command has been halted prematurely due to an error. The signal PANIC indicates that the robot is in panic mode, which is an emergency condition triggered by the controller 110.

In one embodiment, the controller 110 sends a command (or set of commands) to the interface 120 in blocking mode. In this embodiment, the controller 110 waits to receive a reply signal (or multiple reply signals, one for each command) from the interface 120 before it issues the next command (or set of commands). In other words, after the controller 110 has sent a command (or set of commands) to the interface 120, the controller's execution stops and resumes only when the controller receives an acknowledgement (or multiple acknowledgements, one for each command) from the interface 120. In particular, the controller 110 does not send a new command (or set of commands) to the interface 120 until it has received an acknowledgment regarding the previous command (or multiple acknowledgements regarding the previous commands). This acknowledgement can indicate, for example, that the interface 120 has received the command(s), that the interface 120 has successfully begun executing the command(s), or that the interface 120 has finished executing the command(s). Thus, we have the following series of events: The controller 110 issues a command (or set of commands) to the interface 120; the controller 110 receives an acknowledgement (or multiple acknowledgements, one for each command) from the interface 120; and only then does the controller 110 issue a second command (or set of commands) to the interface 120.

In another embodiment, the controller 110 sends a command (or set of commands) to the interface 120 in non-blocking mode. In this embodiment, after the controller 110 has sent a command (or set of commands) to the interface 120, the controller's execution continues even though it has not received an acknowledgement (or multiple acknowledgements, one for each command) from the interface 120.

In one embodiment, the interface 120 executes a received command as soon as possible. In another embodiment, a command includes a starting time that indicates when the command should be executed. In one embodiment, a starting time is absolute, such as 13:10:30, which represents 1:10 pm and 30 seconds. In another embodiment, a starting time is relative and reflects the reverse priority of the command. For example, a first command with a starting time of 40 will be executed after a second command with a starting time of 20, even if the first command was received before the second command. In one embodiment, a query command is always executed as soon as possible. A motion command usually is not executed as soon as possible. In one embodiment, a PANIC signal is always executed immediately.

In one embodiment, the starting time represents the number of seconds or milliseconds to wait until executing the command. If the starting time is zero or negative (or not provided), then the command is executed as soon as possible. In one embodiment, commands with the same priority are executed in their arrival order. In one embodiment, the starting time is provided as an argument to the command.

In one embodiment, a set of configuration descriptors describes a robot's geometric state, regardless of whether the robot is a physical or virtual entity. A robot is represented as a set of rigid links connected by a hierarchical tree of joints. Each link has at most two joints: one joint shared with a parent link and one joint shared with a child link. There exists at least one root link with no parent link, whose position and orientation are defined with respect to the world frame of reference. (In a complex humanoid robot, the root link might be the torso. In a simple robot, the root link might be the only link in the entire robot.) In one embodiment, a particular link is referred to as the "base" of the robot. While the base can be any link, it is often the root link or the link that is present at the robot's center of mass when the robot is in its resting state.

Figure 2:
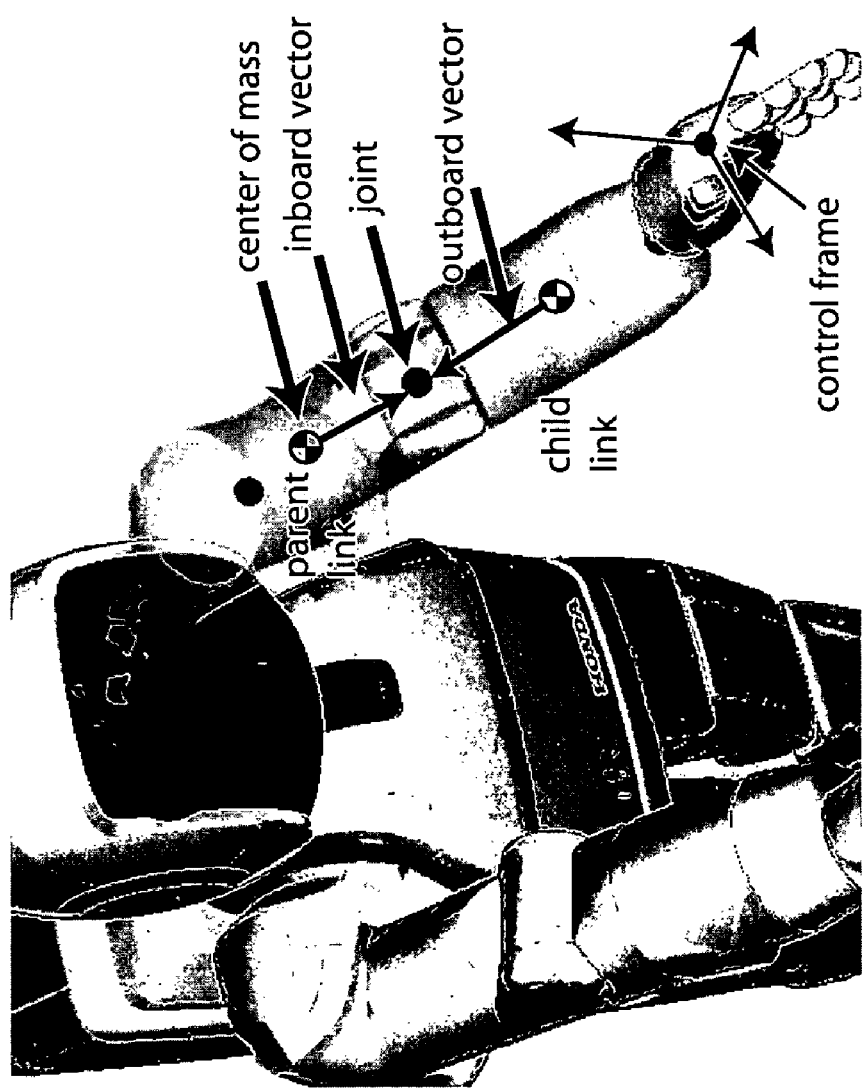
FIG. 2 illustrates a robot and various configuration descriptors, according to one embodiment of the invention.

In one embodiment, robot configuration descriptors include links, joints, and control frames. This representation is sufficient to describe a wide variety of branched, articulated chain mechanisms in arbitrary positions. FIG. 2 illustrates a robot and various configuration descriptors, according to one embodiment of the invention. Each link, joint, and control frame can be referenced by a name. This enables the use of an intuitive or common labeling or naming scheme. For example, various links might be named "leftArm", "torso", "rightLeg", or "head".

In one embodiment, a link includes parameters such as mass, center of mass (a location), and inertia tensors. These parameters are useful for dynamic simulation and can be useful for the design of appropriate controllers.

In one embodiment, a joint stores the local rigid body transformation of a link with respect to its parent. The transformation is defined by a combination of constant parameters and variable degrees of freedom (DOFs) of the joint. The constant portion includes inboard and outboard vectors that position the joint in the local coordinates of the parent link and child link, respectively. A rest matrix represents the joint's local transformation when all of its DOFs equal zero. This enables different initial poses to be defined when the robot's configuration is reset to its rest (or home) state.

Together, the DOFs of each joint comprise the kinematic state of a robot's configuration. In one embodiment, each joint has six DOFs, which enables a fully unconstrained rigid transformation for each link. A DOF is specified as being either prismatic or revolute with a related axis vector. This enables any combination of these transformations, which can produce common robotic joint types such as pin, universal, gimbal, and prismatic joints. A DOF can also include one or more joint limits to constrain movement.

In one embodiment, a control frame has a position and orientation in the local frame of its parent link. In contrast to a joint, a control frame is fixed to a particular link and does not exhibit motions independent from the link. The primary use of a control frame is to specify the location and orientation of an end-effector or task frame used for manipulation. A control frame provides an interface between the robot's generalized coordinates and the desired task.

In one embodiment, a query command or motion command operates on a specific part of a robot, such as a degree of freedom (DOF), a control frame, a base, or the robot as a whole. For example, a query command determines the status of the specific part, while a motion command sets the status of the specific part. In one embodiment, different parts have different characteristics. For example, a DOF includes characteristics such as position, position limit, speed, speed limit, acceleration, acceleration limit, lock status, stop status, limp status, and odometer status. A control frame includes characteristics such as position, position limit, speed, speed limit, acceleration, acceleration limit, lock status, stop status, and odometer status. A base includes characteristics such as position, position limit, speed, speed limit, acceleration, acceleration limit, lock status, stop status, limp status, and odometer status. The robot as a whole includes characteristics such as lock status, stop status, limp status, home status, and motion status.

Query Commands—As described above, a query command is used to determine a robot's state, such as its kinematic configuration. In one embodiment, executing a query command returns the status of a kinodynamic variable. This status can be a measurement, such as an angle of a servo at a joint. If a set of configuration descriptors describes a robot's state, then a query command is like a "read" command for the configuration descriptors.

In one embodiment, a query command specifies one or more variables for which status information should be returned. In another embodiment, a query command returns the entire set of robot configuration descriptors. In one embodiment, the returned information includes information about the structure of the set of robot configuration descriptors. For example, the returned information includes offset indices indicating the locations of joint information, link information, and control frame information within the set of configuration descriptors. The returned information also includes the size of the memory blocks in which the joint information, link information, and control frame information are stored. Also, a joint can be cross-referenced with the links that it joins, a link can be cross-referenced with its parent joint and child joint, and a control frame can be cross-referenced with its parent link.

In one embodiment, the size of a set of configuration descriptors is constant for a particular robot. In other words, if the configuration descriptors are written to a file, the file will be of a fixed length, regardless of the configuration of the robot. This enables the controller 110 to parse the configuration descriptor information in constant-time.

Motion Commands—As described above, a motion command is used to make a robot move, such as by activating one or more motors. Different types of robots can have different types of mechanical capabilities. In one embodiment, the API includes a unified set of descriptors that can be used to describe motion. Since these motion commands are general enough to describe the motions of a wide variety of robots, the API is compatible with different types of robots.

Specific information about a robot's mechanical capabilities is present in the interface 120, rather than in the API. The interface 120 translates an API motion command to specific driver commands. In other words, a motion command is implemented differently by different robots. For example, the command GOTO(x, y, θ) instructs a robot to move from location x to location y. In order to move, a legged robot activates its leg drivers, while a wheeled robot activates its wheel drivers. Thus, for a legged robot, the interface 120 would translate a GOTO command to commands to activate leg drivers. For a wheeled robot, the interface 120 would translate a GOTO command to commands to activate wheel drivers. Note that even though making a legged robot walk is difficult (due to stability issues), this difficulty is shielded from the controller 110 by the API. The controller 110 merely needs to issue a simple motion command such as GOTO.

Controlling a robot joint depends on whether an actuator is present at the joint. The types of servo commands accepted by an actuator (e.g., setPoint, setSpeed, and setForce) depend on how the robot is implemented. In one embodiment, each joint and/or control frame is associated with a servo command type that indicates the supported motion commands. A joint or control frame can support one or more types of servo commands.

Recall that if a set of configuration descriptors describes a robot's state, then a query command is like a "read" command for the configuration descriptors. A motion command, on the other hand, causes a robot to move (which changes its configuration descriptors) and thus is like a "write" command for the configuration descriptors.

A motion command can include one or more arguments. In one embodiment, an argument that represents a physical quantity (such as how far to move) is expressed in metric (MKS) units.

System Commands—As described above, a system command is used to query or control system status. In one embodiment, system status includes communication mode and panic mode. Communication mode, which can be direct, delay, playback, or broadcast, is described below. Panic mode is either on or off. When a robot enters panic mode, it can perform one or more actions and/or execute one or more processes. For example, a robot can cease executing commands until it is no longer in panic mode. In one embodiment, the set of robot driver modules 130 controls a robot's response to being put in panic mode and can be customized for each robot.

2. Interface for Robot Motion Control

Figure 3:
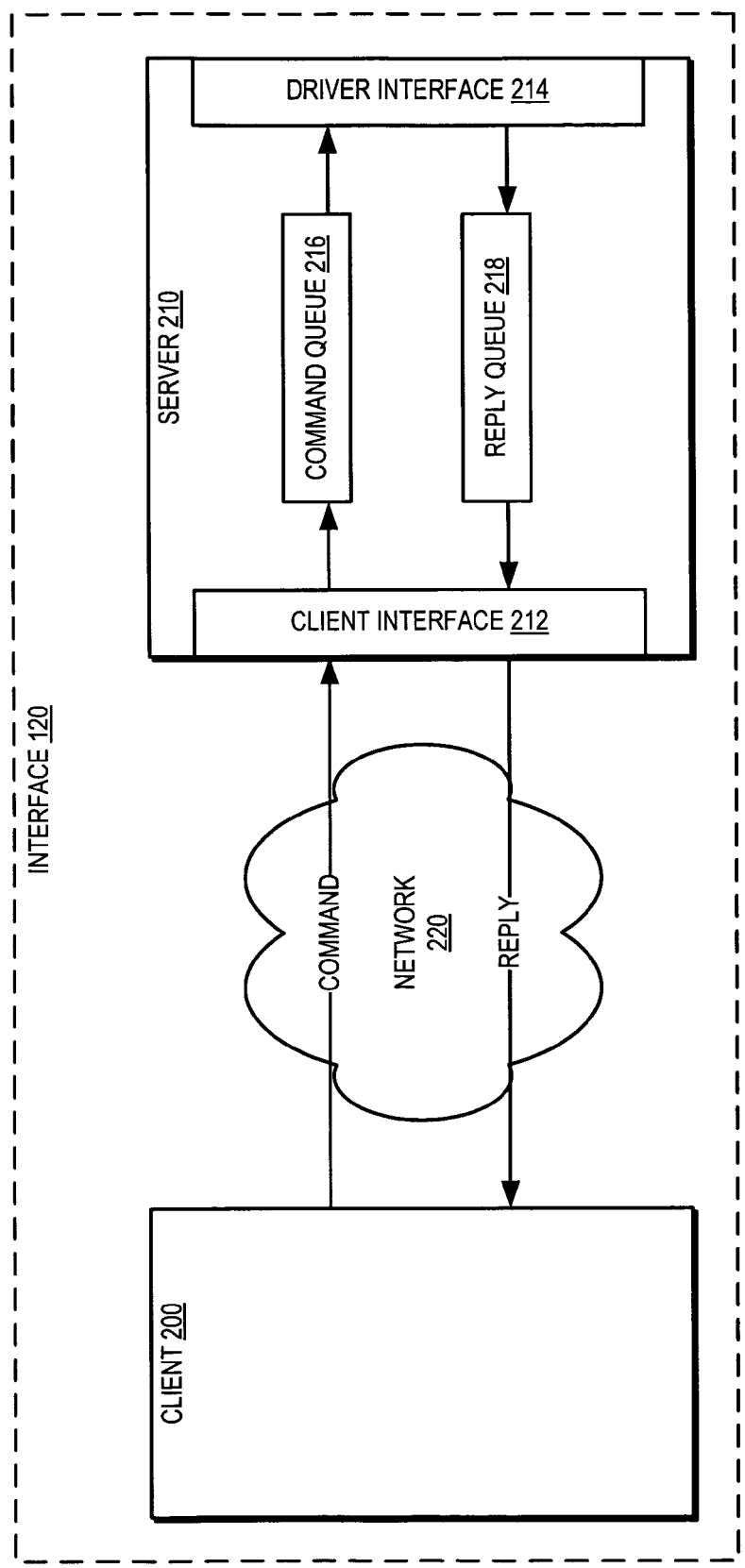
FIG. 3 illustrates a more detailed view of the interface shown in FIG. 1, according to one embodiment of the invention.

FIG. 3 illustrates a more detailed view of the interface shown in FIG. 1, according to one embodiment of the invention. The interface 120 includes a client 200, a server 210, and a network 220. The client 200 is communicatively coupled to the server 210 via the network 220. The client 200 and the server 210 represent groups of functionality and can be implemented in only hardware, only software, or a mixture of both. In addition, while they are illustrated as separate modules in FIG. 3, the functionality of multiple modules can be implemented in a single software application or hardware device.

In one embodiment, the client 200 and the server 210 comprise software applications running on top of operating systems. Any programming or scripting language can be used to write the software applications, such as C++, Java, and Perl. Any operating system can be used, such as Linux, Mac OS from Apple Computer, Inc. of Cupertino, Calif., and Windows from Microsoft Corp. of Redmond, Wash. In one embodiment, the client 200 and the server 210 use different programming languages, different software applications, and/or different operating systems. In order to preserve compatibility across operating systems, in one embodiment, the client 200 and/or the server 210 are implemented using software libraries that can be ported to various hardware and software platforms. In particular, proprietary software tools and libraries are not used.

The server 210 includes two interfaces (a client interface 212 and a driver interface 214) and two buffers (a command queue 216 and a reply queue 218). The client interface 212 enables the server 210 to receive signals from and send signals to the client 200 via the network 220. The driver interface 214 enables the server 210 to receive signals from and send signals to the set of robot driver modules 130.

As explained above, differences between robots affect the interface 120 but not the controller 110. Specifically, the driver interface 214 portion of the interface 120 will translate controller 110 API commands differently based on the robot driver module 130 API available for each robot. Thus, a change in a robot's software or hardware will affect the driver interface 214 but not the controller 110.

In one embodiment, described below but not shown here, the server 210 includes a third buffer (a playback queue). In another embodiment, described below but not shown here, the client 200 includes one buffer (a reply cache).

The network 220 comprises any type of communication mechanism. If the client 200 and the server 210 are co-located (e.g., software applications running on the same machine), the network 220 can include local communication mechanisms such as shared memory. If the client 200 and server 210 are not co-located, the network 220 can include remote communication mechanisms such as communications protocols running on top of wired or wireless connections. The communications protocols can include, for example, the Transmission Control Protocol/Internet Protocol (TCP/IP) suite, the User Datagram Protocol (UDP), or the Data Distribution Service for Real-time Systems Specification from Object Management Group, Inc. of Needham, Mass.

The communication mechanism, regardless of its type, supports a communication protocol. The communication protocol supports four command modes, which will be described below. In one embodiment, the communication protocol is based on network packages, each of which includes a header portion and a payload portion. In this embodiment, the client 200 and server 210 communicate by sending packages to each other via the network 220.

In a package sent from the server 210 to the client 200, the payload portion includes one or more replies, where a reply is either a status signal or an error signal. In one embodiment, each time a reply is placed in the reply queue 218, the server 210 creates a package containing that reply and sends the package to the client 200 via the client interface 212. In another embodiment, the server 210 creates and sends packages periodically, for example after a particular period of time has elapsed (if any replies have been placed in the reply queue 218) or after a particular number of replies have been placed in the reply queue 218.

In a package sent from the client 200 to the server 210, the payload portion includes one or more commands. In one embodiment, "read" commands (such as query commands or system commands that query system status) and "write" commands (such as motion commands or system commands that set system status) are not sent in the same package. The header portion is of a fixed-length and includes the size of the payload, the type of the payload (e.g., "read" or "write"), and a panic flag. When the server 210 receives a package with the panic flag set, it puts the robot into panic mode. Thus, a robot's panic mode is set by the package header, not by the package payload.

The data in a package can be of any format, such as binary, plain text (e.g., XML), etc. In one embodiment, when the data is in binary format, the values within a payload are stored in network-byte-order integer format to support compatibility across systems. This is to address byte ordering differences among little-endian and big-endian processors. Thus, command parameters and other configuration descriptors are expressed in integers. In one embodiment, the client 200 and the server 210 convert arguments into integer representations as necessary.

The network 220 has various characteristics, such as latency and bandwidth, that will vary based on the communication mechanisms used. For example, the network's latency will probably increase as the distance between the client 200 and the server 210 increases. Since the interface 120 is a black box from the controller's perspective, the controller 110 works the same way regardless of the connection characteristics. This modularity is achieved by operating the interface 120 in various communication modes, which will be explained below. Thus, the network 220 is versatile enough to enable both remote and local motion control.

Returning to the server 210, the client interface 212 reads packages received from the client 200. The one or more commands in each package payload are parsed. Then, the commands are executed by the driver interface 214 by translating them into signals for the set of robot driver modules 130 and sending these signals to the robot driver modules 130.

The commands are not necessarily executed in the order that they arrived. Instead, they are stored in a command queue 216 and scheduled for execution according to their starting times, as described above. In one embodiment, a PANIC signal is not stored in the command queue 216 at all. Instead, it is executed immediately by the client interface 212. All other commands are blocked until the PANIC signal is reset.

If a robot generates a reply signal in response to a command, the reply signal is transmitted to the driver interface 214 via the set of robot driver modules 130. The reply signals are parsed and then sent by the client interface 212 to the client 200. The replies are not necessarily sent to the client 200 in the order that they arrived. Instead, they are stored in a reply queue 218. In one embodiment, the replies in the reply queue 218 are scheduled for transmission according to their insertion times into the queue.

3. Communication Mode

Figure 4:
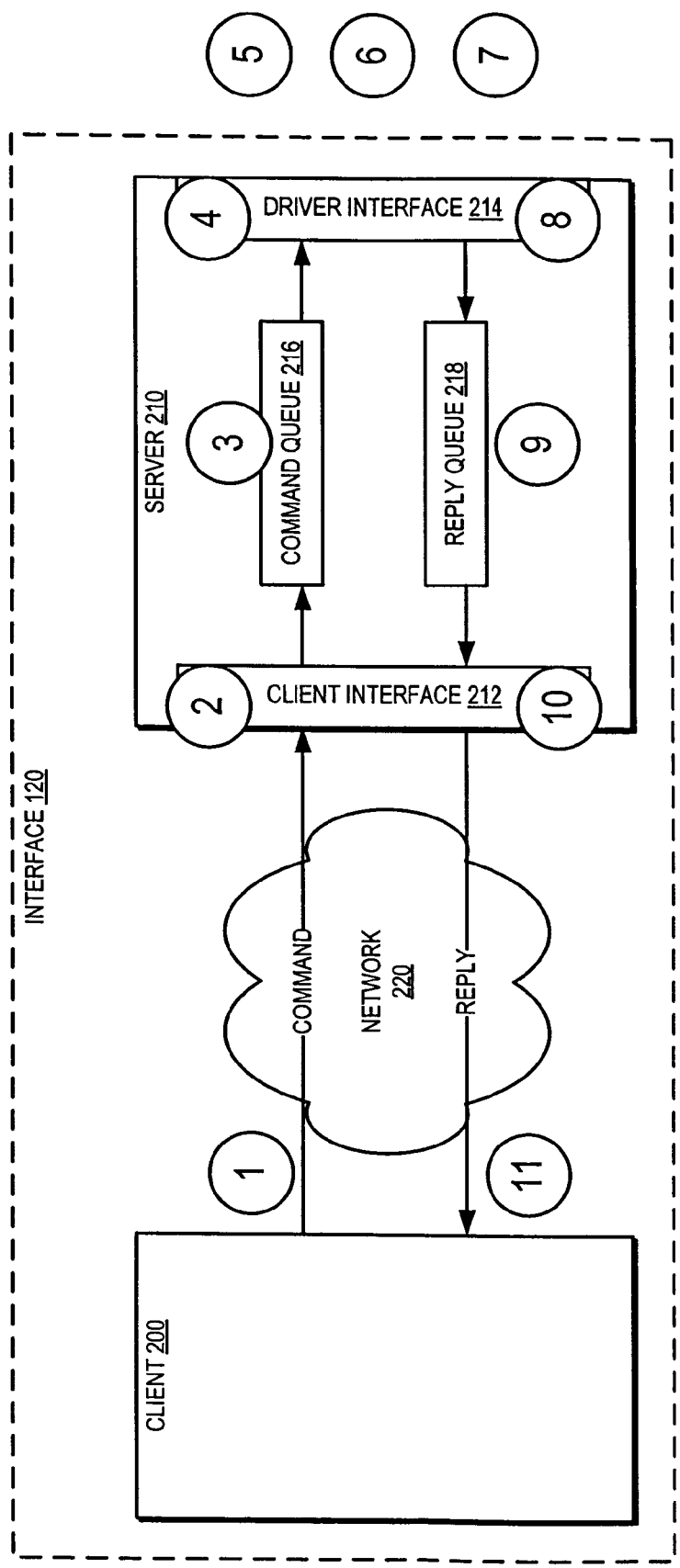
FIG. 4 illustrates how a signal flows through the elements shown in FIG. 3, according to one embodiment of the invention.

The interface 120 can operate in four communication modes: direct, delay, playback, and broadcast. Before these modes are described, consider how a signal generally flows through the interface 120. FIG. 4 illustrates how a signal flows through the elements shown in FIG. 3, according to one embodiment of the invention. FIG. 4 illustrates the following steps: 1) The client 200 sends a package (containing a set of one or more commands) to the server 210 via the network 220. 2) The client interface 212 receives the commands. 3) The commands are placed in the command queue 216. 4) The driver interface 214 accesses a command from the command queue 216. 5) The driver interface 214 sends a signal to the set of robot driver modules 130. 6) The robot driver modules 130 cause the robot to execute the command. 7) The robot generates a reply signal, which is sent to the driver modules 130. 8) The driver interface 214 receives the reply signal from the driver modules 130. 9) The reply signal is placed in the reply queue 218. 10) The client interface 212 accesses the reply signal from the reply queue 218. 11) The client interface 212 sends the reply signal to the client 200 via the network 220.

In direct mode, sometimes referred to as "direct drive," the client 200 sends packages to the server 210 in blocking mode. In other words, after the client 200 has sent a package to the server 210 containing a set of one or more commands (step 1), the client's execution stops and resumes only when the client receives acknowledgements from the server 210 for all of the commands in the package (sent in step 11). In particular, the client 200 does not send a new package to the server 210 until it has received acknowledgments regarding all of the commands in the previous package. An acknowledgement can indicate, for example, that the server 210 has received the command, that the server 210 has successfully begun executing the command, or that the server 210 has finished executing the command. Thus, we have the following series of events: The client 200 issues a first set of one or more commands to the server 210; the client 200 receives acknowledgements from the server 210 regarding all of the commands in the first set; and only then does the client 200 issue a second set of commands to the server 210. Note that, in direct mode, if the network 220 is slow (during step 1, step 11, or both), this will increase the amount of time between each command set issuance by the client 200.

In one embodiment, in direct mode, once a connection has been established between the client 200 and the server 210, the client 200 and the server 210 synchronize their clocks. Then, the client 200 starts accepting signals (e.g., API function calls) from the controller 110 to control the robot. When an API function call is received, the client 200 creates a network package that includes one or more commands to be executed by the robot. Each command is tagged with a unique identifier, and the package is sent to the server 210 via the network 220. The client's execution halts inside the API function call until the client 200 receives, from the server 210, acknowledgements regarding all of the commands in the sent package. In one embodiment, a time-out mechanism is present so that an API function call can return even if the server 210 crashes or the network 220 breaks down.

The server 210 receives the network package from the client 200. The client interface 212 parses the package header. If the panic flag is set in the header, the driver interface 214 puts the robot into panic mode. The server's queues are flushed (e.g., the command queue 216 and the reply queue 218) and reject new commands until the robot is no longer in panic mode.

If the panic flag is not set in the header, the client interface 212 parses the package payload and places the one or more commands into the command queue 216. Commands with starting times of zero or a negative number will be executed before commands with positive starting times, as described above. Thus, in direct mode, the transmission and execution of these types of commands follows a hand-shake model.

In direct mode, if the client's clock and the server's clock have been synchronized, the server 210 generally executes the command when its clock is equal to the command's starting time. However, if the clocks have not been synchronized, the server does not execute the command at this time. Instead, the server determines the time offset between its clock and the client's clock and executes the command when its clock is equal to the sum of the time offset and the command's starting time.

Sometimes the server 210 can fall behind in executing commands. In one embodiment, the server 210 does not execute a particular command, even if the server's clock has reached the appropriate time, unless commands that were supposed to precede the particular command have already been executed. For example, the driver interface 214 verifies that the starting time of the command with the highest priority has passed with respect to the server clock.

In delay mode, playback mode, and broadcast mode, the client 200 sends packages to the server 210 in non-blocking mode. In other words, after the client 200 has sent a package to the server 210, the client's execution continues even though it has not received an acknowledgement from the server 210.

In blocking mode, the client 200 waits to receive the one or more reply signals (sent in step 11) before it issues the next command or set of commands. Thus, replies to all the commands in one package will arrive at the client 200 prior to replies to commands in a subsequent package. In other words, if the client 200 issues a first package with a single command and then (after receiving a reply) a second package with a new command, it will always receive the reply to the first command before receiving the reply to the second command. In non-blocking mode, the client 200 does not wait to receive the reply signal before it issues the next command. Thus, replies will not necessarily arrive at the client 200 in the same order that the associated commands were issued. In other words, if the client 200 issues a first command and then a second command, it might receive a reply to the second command and then a reply to the first command.

There can be many reasons why the replies arrive in a different order. One reason is that the commands might have different priorities, so that they are executed in a different order by the server 210 (specifically, the driver interface 214). Another reason is that the commands might require different amounts of time in order to generate a reply.

In one embodiment, in order to handle replies received "out-of-order," the client 200 includes a reply cache (not shown) that stores replies received from the server 210. The reply cache can include, for example, a dictionary data structure. The element keys are the original commands for which the server 210 generated a reply. In one embodiment, an element key is the unique identifier that was tagged to the command by the client 200. The client 200 can periodically query the reply cache to determine whether the reply to a particular command has been received. In one embodiment, the dictionary data structure is implemented as a hash map, such as the hash multi-map described in the C++ Standard Template Library (part of the C++ Standard Library, a standard managed by the International Organization for Standardization (ISO) and the International Electrotechnical Commission (IEC)).

Recall that any network, including network 220, has various characteristics, such as latency and bandwidth, that will vary based on the communication mechanisms used. In delay mode and playback mode, the server 210 uses buffering to compensate for possible network congestion. In one embodiment, the buffering is achieved by delaying (on the part of the driver interface 214 and, thus, the robot) the execution of a sequence of commands. This delay helps to preserve the inter-frame timing (execution timing between commands contained in different packages) in the presence of network limitations such as high latency and/or low bandwidth. The execution of the commands is delayed, but the inter-frame timings are preserved because the command queue 216 acts as a buffer. For example, a longer delay (or larger amount of buffering) can be used to help a client command a robot to execute a difficult motion sequence over a congested network connection.

In delay mode, the client 200 controls the size of the time delay. In one embodiment, in delay mode, once a connection has been established between the client 200 and the server 210, the client 200 synchronizes its clock to the server's local time plus the time delay.

The commands contained in the package will thus have a time offset relative to the server's clock. Thus, when the driver interface 214 checks the contents of the command queue 216, it will not execute the commands until the time delay has elapsed. In one embodiment, the interface 120 operates in delay mode with a time delay of zero. This embodiment is similar to direct mode, except that the client 200 operates in non-blocking mode, so client-server transactions do not necessarily obey the hand-shake model.

In playback mode, the server 210 controls the size of the time delay. In one embodiment, the server 210 determines the time delay based on the observed network congestion. In playback mode, in one embodiment, the server 210 includes a third cache called the playback queue. When the client interface 212 parses a package to obtain a command, the command is placed in the playback queue rather than in the command queue 216.

In one embodiment, the server 210 estimates both the average command execution rate and the average command transmission rate (for example, 2 commands per second). The execution rate is estimated using the starting times of the commands in the playback queue. The transmission rate is estimated using package timestamps. (In one embodiment, the client 200 timestamps each package before it sends the package to the sever 210.)

In one embodiment, the execution and transmission rates are used to determine how large the playback queue should be before its contents are emptied into the command queue 216. In one embodiment, the playback queue is emptied once the number of commands it contains exceeds the value of [(execution rate–transmission rate)*duration of motion sequence]. In one embodiment, once the contents of the playback queue have been emptied into the command queue 216, the remainder of the commands in the motion sequence is stored directly in the command queue 216 after being received by the server 210.

In one embodiment, the starting times of the commands in the motion sequence are delayed by an amount computed by the server. In one embodiment, the time delay ($T_{delay}$) is equal to the server time when the playback queue is emptied (T) minus the starting time of the first command in the motion sequence ($t_1$). In other words, $T_{delay}=T-t_1$.

The motion sequence is thus delayed and buffered by the server 210, and the driver interface 214 executes the commands at the proper times, even during network congestion. In one embodiment, after a sufficient number of commands have been parsed, the server 210 determines the ratio of the average time between commands to the average time between package arrivals and uses this ratio to determine the time delay.

In playback mode, the inter-frame timings are important. Thus, the clocks of the client 200 and the server 210 do not need to be synchronized. In playback mode, the duration of the motion sequence should be known by the client. Also, the execution times of the commands should be roughly evenly-spaced. In one embodiment, if the execution times of the commands are not evenly-spaced, additional commands can be inserted to change the time spacings. These commands can be, for example, "no-operation" commands or commands whose values are interpolated based on the values of the previous command and the next command.

In broadcast mode, one "read" command received from a client 200 can cause a server 210 to query a robot's state periodically. In one embodiment, the server accomplishes this via a specialized query command that periodically re-inserts a delayed copy of itself into the command queue 216. For example, a client 200 transmits a broadcast request and an associated sampling time. The server 210 inserts into the command queue 216 a query about the robot's state. After the query has been executed, the state information is sent to the client 200 as a reply. Also, a copy of the query is created and reinserted into the command queue 216 with a priority that has been increased by the sampling time. Thus, the query command regenerates itself for future execution by the driver interface 214. The regeneration process stops once the server 210 has received a client request to cancel broadcasts.

4. Additional Embodiments

Figure 5:
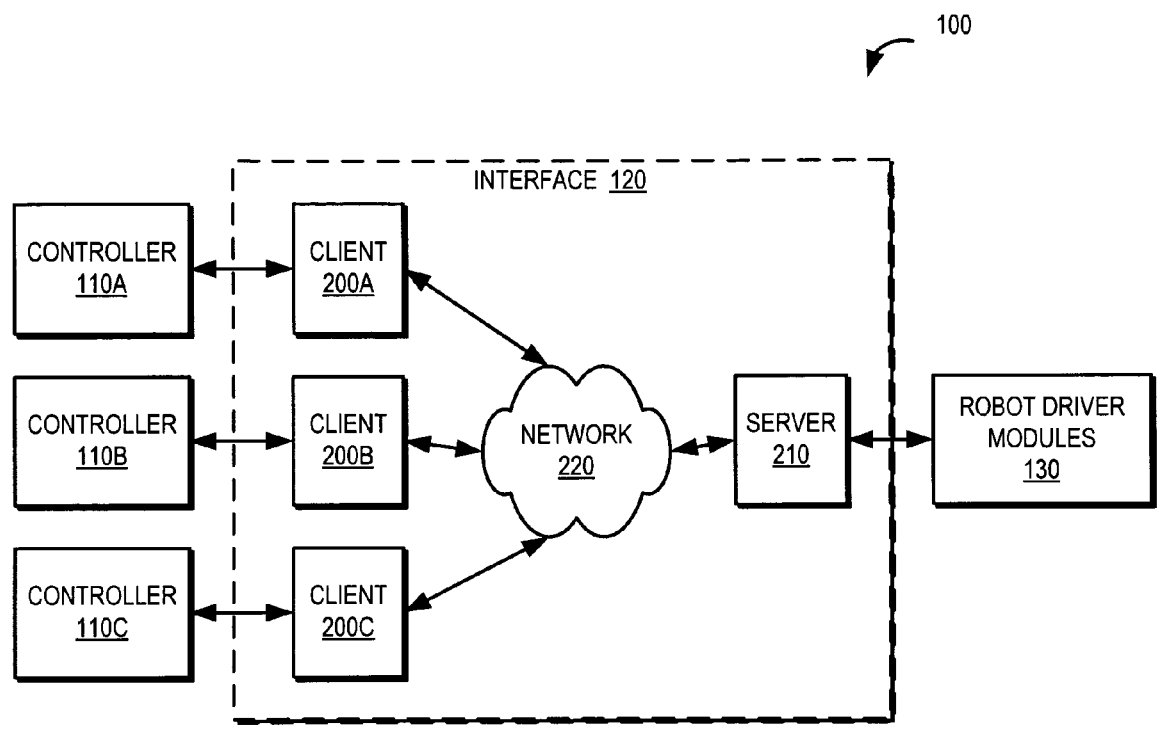
FIG. 5 illustrates a block diagram of a system for enabling multiple higher-level software applications to control a robot's motion through a generic motion interface, according to one embodiment of the invention.

Multiple controllers—The interface 120 described above with respect to FIG. 1 can also be used in a system where multiple controllers 110 control one robot. FIG. 5 illustrates a block diagram of a system for enabling multiple higher-level software applications to control a robot's motion through a generic motion interface, according to one embodiment of the invention. The system 100 includes three controllers 110A, 110B, 110C, an interface 120, and a set of robot driver modules 130. The system 100 in FIG. 5 is similar to the system 100 in FIG. 1, except that the system 100 in FIG. 5 includes multiple controllers 110 instead of just one. Although the illustrated embodiment shows three controllers 110, any number of controllers 110 can be used.

The controllers 110A, 110B, 110C in FIG. 5 are similar to the controller 110 in FIG. 1. In one embodiment, a controller 110 is a software application used to control a robot's motion. In one embodiment, each controller 110 runs on a different piece of hardware. In another embodiment, multiple controllers 110 run on the same piece of hardware.

The interface 120 in FIG. 5 includes three clients 200A, 200B, 200C, a server 210, and a network 220. The interface 120 in FIG. 5 is similar to the interface 120 in FIG. 1 except that the interface 120 in FIG. 5 includes three clients 200 instead of just one. Although the illustrated embodiment shows three clients 200, any number of clients 200 can be used. In one embodiment, the number of clients 200 in the interface 120 is equal to the number of controllers 110 in the system 100.

The set of robot driver modules 130 in FIG. 5 is similar to the set of robot driver modules 130 in FIG. 1.

When a system 100 includes multiple controllers 110, the controllers 110 can potentially interfere with each other's operation. For example, one controller 110A can issue a command to the robot to move left, while another controller 110B can issue a command to the robot to move right simultaneously. In one embodiment, in order to prevent interference between controllers 110, a locking mechanism is used to control access to a robot by various controllers 110.

Note that, in general, interference occurs only when multiple controllers 110 are issuing "write" commands that seek to simultaneously affect the same part of a robot. As discussed above, write commands can change a robot's state and include motion commands and system commands that set system status, while read commands cannot change a robot's state and include query commands and system commands that query system status. Interference generally does not occur when 1) the commands are read commands, 2) the commands do not seek to affect the robot simultaneously, or 3) the commands do not seek to affect the same part of the robot.

In one embodiment, when one controller 110 puts the robot into panic mode, the server 210 blocks all other commands from being executed until the robot is no longer in panic mode, even if a different controller 110 issued the commands.

Figure 6:
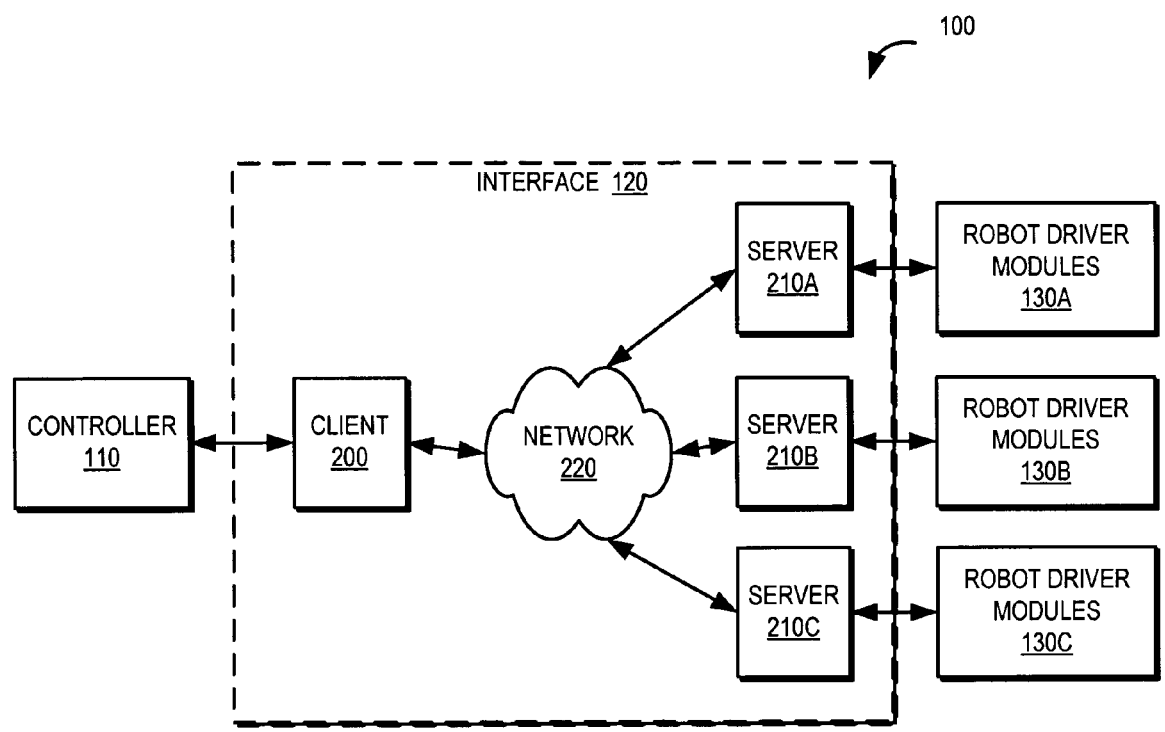
FIG. 6 illustrates a block diagram of a system for enabling a higher-level software application to control multiple sets of robot drivers through a generic motion interface, according to one embodiment of the invention.

Multiple sets of drivers—The interface 120 described above with respect to FIG. 1 can also be used in a system where one controller 110 controls multiple sets of robot drivers 130. FIG. 6 illustrates a block diagram of a system for enabling a higher-level software application to control multiple sets of robot drivers through a generic motion interface, according to one embodiment of the invention. The system 100 includes a controller 110, an interface 120, and three sets of robot driver modules 130A, 130B, 130C. The system 100 in FIG. 6 is similar to the system 100 in FIG. 1, except that the system 100 in FIG. 6 includes multiple sets of robot driver modules 130 instead of just one. Although the illustrated embodiment shows three sets of robot driver modules 130, any number of sets of robot driver modules 130 can be used.

The illustrated embodiment can be used, for example, to control a modular robot. A modular robot is a robot that is made of other robots. One example of a modular robot is a robot that includes a mobile base and an arm that is rigidly attached to the base but that can perform motions (such as flexion and extension) by activating its motors. Another example is a robot that includes a mobile base, a left arm, and a right arm.

The controller 110 in FIG. 6 is similar to the controller 110 in FIG. 1.

The interface 120 in FIG. 6 includes one client 200, three servers 210A, 210B, 210C, and a network 220. The interface 120 in FIG. 6 is similar to the interface 120 in FIG. 1 except that the interface 120 in FIG. 6 includes three servers 210 instead of just one. Although the illustrated embodiment shows three servers 210, any number of servers 210 can be used. In one embodiment, the number of servers 210 in the interface 120 is equal to the number of sets of robot driver modules 130 in the system 100.

The sets of robot driver modules 130 in FIG. 6 are similar to the set of robot driver modules 130 in FIG. 1. In one embodiment, each set of robot driver modules 130 in FIG. 6 is configured to control a different robot (or a different part of a modular robot). For example, one set of robot driver modules 130 controls a base, while another set of robot driver modules 130 controls an arm.

Note that the functionalities of a modular robot can be greater than the sum of its parts. That is, a modular robot can have additional functionalities above and beyond the functionalities of each of its component robots or parts. For example, consider a modular robot that includes a left arm and a right arm. Individually, each arm can perform particular motions, such as flexion/extension and grasping/ungrasping. Together, however, they can perform additional motions, such as supporting an object by balancing it on top of the two arms.

While the system 100 of FIG. 6 can be used to perform such complex motions, it is difficult for the controller 110 to coordinate the multiple sets of robot driver modules 130. The interface 120 described above with respect to FIG. 1 can also be used to create a "composite" robot that hides this complexity.

Figure 7:
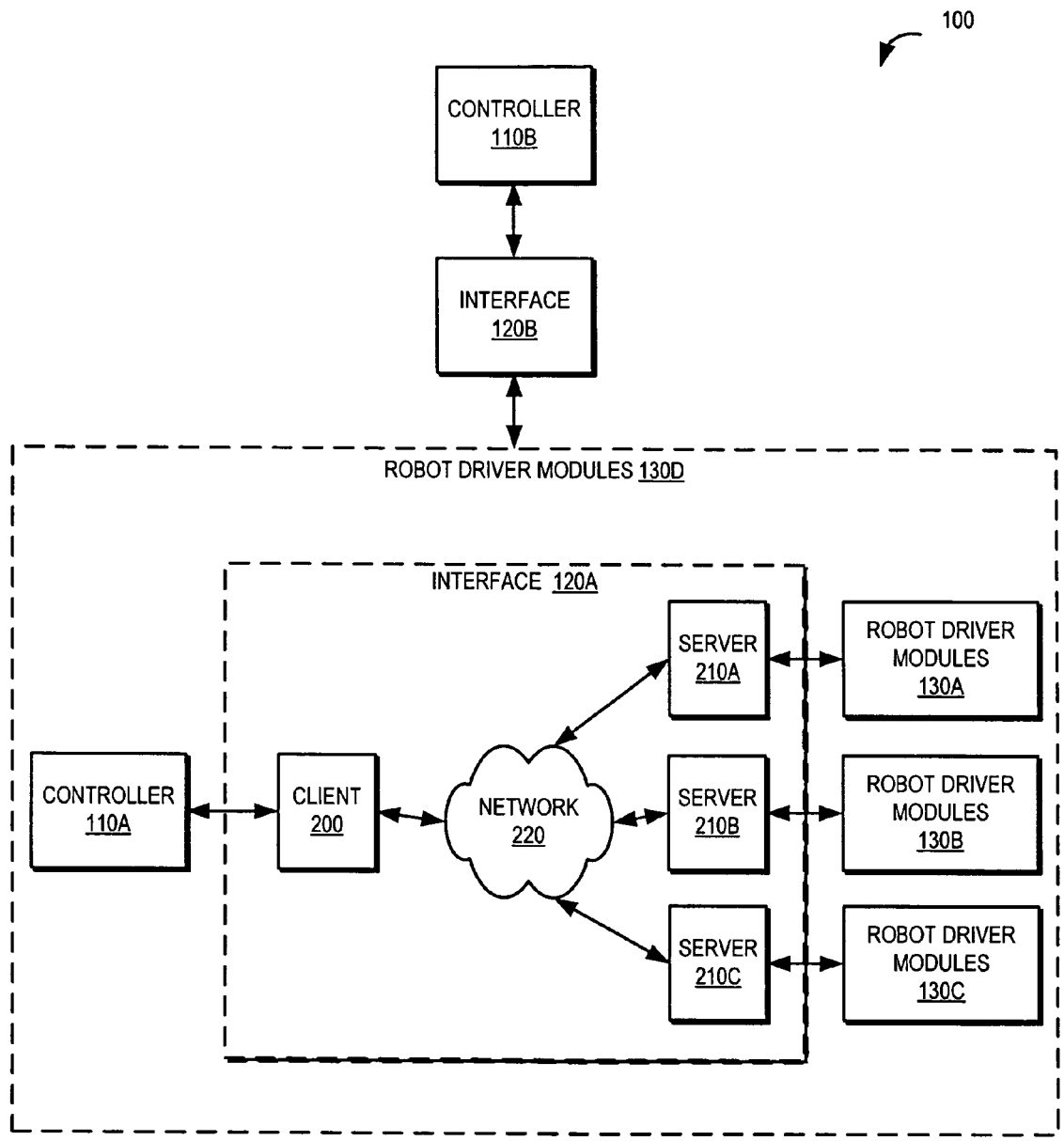
FIG. 7 illustrates a block diagram of a system for enabling a higher-level software application to control a composite robot through a generic motion interface, according to one embodiment of the invention.

FIG. 7 illustrates a block diagram of a system for enabling a higher-level software application to control a composite robot through a generic motion interface, according to one embodiment of the invention. The system 100 includes a controller 110B, an interface 120B, and a set of robot driver modules 130D. Note that the "set of robot driver modules" 130D is equivalent to the system 100 in FIG. 6. The API of the interface 120B enables the controller 110B to issue commands for complex motions while shielding the controller 110B from the complexity of the multiple sets of driver modules 130A, 130B, 130C. In this way, one controller 110B can issue a command for a complex motion, and the other controller 110A can perform the motion by using the multiple sets of driver modules 130A, 130B, 130C.

Note that while FIGS. 5, 6, and 7 described various systems 100 that included multiple controllers 110, multiple sets of robot driver modules 130, and a composite robot, respectively, these systems can be combined to form additional types of systems. For example, an additional controller 110 can be added to the system 100 of FIG. 6 or the system 100 of FIG. 7. As another example, an additional set of robot driver modules 130 can be added to the system 100 of FIG. 5 or the system 100 of FIG. 7.

Although the invention has been described in considerable detail with reference to certain embodiments thereof, other embodiments are possible as will be understood to those skilled in the art. For example, another embodiment is described in "RoboTalk: Controlling Arms, Bases and Androids Through a Single Motion Interface" by A. Y. Yang, H. Gonzalez-Bafios, V. Ng-Thow-Hing, and J. E. Davis, Proceedings of the International Conference on Advanced Robotics (ICAR), Seattle, Wash., Jul. 18-20, 2005, which is hereby incorporated by reference.

What is claimed is:

1. A method for controlling a robot, comprising:
receiving, from a robot controller software module, a robot-independent software command that is independent of the robot's hardware capabilities, wherein the robot-independent software command includes an absolute starting time that indicates when to execute the robot-independent software command based on a clock;
determining a first configurable time period based on the absolute starting time;
waiting for the first configurable time period to elapse;
determining by a processor, after the first configurable time period has elapsed, a robot-dependent software command that is not independent of the robot's hardware capabilities based on the robot-independent software command;
sending, to a robot driver software module, the robot-dependent software command;
receiving, from the robot driver software module, a first reply;
waiting for a second configurable time period to elapse;
determining, after the second configurable time period has elapsed, a second reply based on the first reply; and
sending, to the robot controller software module, the second reply.

2. The method of claim 1, further comprising:
determining an amount of network congestion that affects commands received from the robot controller software module; and
determining the first configurable time period based on the amount of network congestion.

3. The method of claim 1, wherein receiving, from the robot controller software module, the robot-independent software command comprises receiving, from the robot controller software module, a set of commands that includes the robot-independent software command.

4. The method of claim 1, wherein receiving, from the robot controller software module, the robot-independent software command comprises receiving, from one of a plurality of robot controller software modules, the robot-independent software command.

5. The method of claim 1, wherein sending, to the robot driver software module, the robot-dependent software command comprises sending, to one of a plurality of robot driver software modules, the robot-dependent software command.

6. The method of claim 1, wherein the robot-independent software command comprises a motion command.

7. The method of claim 1, wherein the robot-independent software command differs from the robot-dependent software command.

8. A system for controlling a robot, comprising:
means for receiving, from a robot controller software module, a robot-independent software command that is independent of the robot's hardware capabilities, wherein the robot-independent software command includes an absolute starting time that indicates when to execute the robot-independent software command based on a clock;
means for determining a first configurable time period based on the absolute starting time;

means for waiting for the first configurable time period to elapse;

means for determining, after the first configurable time period has elapsed, a robot-dependent software command that is not independent of the robot's hardware capabilities based on the robot-independent software command;

means for sending, to a robot driver software module, the robot-dependent software command;

means for receiving, from the robot driver software module, a first reply;

means for waiting for a second configurable time period to elapse;

means for determining, after the second configurable time period has elapsed, a second reply based on the first reply; and means for sending, to the robot controller software module, the second reply.

9. The system of claim 8, further comprising:
means for determining an amount of network congestion that affects commands received from the robot controller software module; and
means for determining the first configurable time period based on the amount of network congestion.

10. The system of claim 8, wherein receiving, from the robot controller software module, the robot-independent software command comprises receiving, from the robot controller software module, a set of commands that includes the robot-independent software command.

11. The system of claim 8, wherein receiving, from the robot controller software module, the robot-independent software command comprises receiving, from one of a plurality of robot controller software modules, the robot-independent software command.

12. The system of claim 8, wherein sending, to the robot driver software module, the robot-dependent software command comprises sending, to one of a plurality of robot driver software modules, the robot-dependent software command.

13. The system of claim 8, wherein the robot-independent software command comprises a motion command.

14. The system of claim 8, wherein the robot-independent software command differs from the robot-dependent software command.

15. A computer program product stored on a non-transitory computer-readable medium and including instructions that, when loaded into memory, cause a processor to perform a set of operations for controlling a robot, the set of operations comprising:

receiving, from a robot controller software module, a robot-independent software command that is independent of the robot's hardware capabilities, wherein the robot-independent software command includes an absolute starting time that indicates when to execute the robot-independent software command based on a clock;

determining a first configurable time period based on the absolute starting time;

waiting for the first configurable time period to elapse;

determining, after the first configurable time period has elapsed, a robot-dependent software command that is not independent of the robot's hardware capabilities based on the robot-independent software command;

sending, to a robot driver software module, the robot-dependent software command;

receiving, from the robot driver software module, a first reply;

waiting for a second configurable time period to elapse;

determining, after the second configurable time period has elapsed, a second reply based on the first reply; and sending, to the robot controller software module, the second reply.

16. The computer program product of claim 15, wherein the set of operations further comprises:
determining an amount of network congestion that affects commands received from the robot controller software module; and
determining the first configurable time period based on the amount of network congestion.

17. The computer program product of claim 15, wherein receiving, from the robot controller software module, the robot-independent software command comprises receiving, from the robot controller software module, a set of commands that includes the robot-independent software command.

18. The computer program product of claim 15, wherein receiving, from the robot controller software module, the robot-independent software command comprises receiving, from one of a plurality of robot controller software modules, the robot-independent software command.

19. The computer program product of claim 15, wherein sending, to the robot driver software module, the robot-dependent software command comprises sending, to one of a plurality of robot driver software modules, the robot-dependent software command.

20. The computer program product of claim 15, wherein the robot-independent software command comprises a motion command.

* * * * *